US010508793B2

(12) United States Patent
Flynn et al.

(10) Patent No.: US 10,508,793 B2
(45) Date of Patent: Dec. 17, 2019

(54) ARTIFICIAL SKYLIGHT AND METHODS

(71) Applicant: INNERSCENE, INC., San Francisco, CA (US)

(72) Inventors: Sean Flynn, Gloucester (GB); Jonathan Clark, San Francisco, CA (US)

(73) Assignee: INNERSCENE, INC., San Francisco, CA (US)

(*) Notice: Subject to any disclaimer, the term of this patent is extended or adjusted under 35 U.S.C. 154(b) by 321 days.

(21) Appl. No.: 15/259,138

(22) Filed: Sep. 8, 2016

(65) Prior Publication Data

US 2017/0074486 A1 Mar. 16, 2017

Related U.S. Application Data

(60) Provisional application No. 62/253,944, filed on Nov. 11, 2015, provisional application No. 62/219,419, filed on Sep. 16, 2015.

(51) Int. Cl.
F21S 8/02 (2006.01)
F21V 3/06 (2018.01)
F21V 5/02 (2006.01)
F21V 7/05 (2006.01)
F21V 8/00 (2006.01)
(Continued)

(52) U.S. Cl.
CPC ............ F21V 13/14 (2013.01); F21S 8/026 (2013.01); F21V 5/02 (2013.01); F21V 3/061 (2018.02); F21V 7/05 (2013.01); F21Y 2115/10 (2016.08)

(58) Field of Classification Search
CPC ...................................... F21S 8/026
See application file for complete search history.

(56) References Cited

U.S. PATENT DOCUMENTS 5,251,392 A * 10/1993 McManigal ............ F21V 9/02
362/276
6,536,921 B1 3/2003 Simon
8,469,550 B2 6/2013 Di Trapani et al.
(Continued)

FOREIGN PATENT DOCUMENTS

CN 102713413 A 10/2012
CN 203223828 U 10/2013
(Continued)

OTHER PUBLICATIONS

International Preliminary Report on Patentability dated Mar. 29, 2018 with Written Opinion dated Dec. 19, 2016 in counterpart Intl. Application No. PCT/US2016/050613.
(Continued)

Primary Examiner — Anh T Mai
Assistant Examiner — Zachary J Snyder
(74) Attorney, Agent, or Firm — Duane Morris LLP

(57) ABSTRACT

An artificial skylight generally includes at least one light source, at least one first collimator, a prism sheet, and at least one transmissive material. The at least one first collimator is configured to collimate light from the at least one light source. The prism sheet is disposed adjacent to the at least one first collimator and is configured to reflect and refract collimated light received from the at least one first collimator. The at least one transmissive material is disposed adjacent to the prism sheet and is configured to radiate light diffusely.

26 Claims, 15 Drawing Sheets

(51) Int. Cl.
*F21V 13/14* (2006.01)
*F21Y 115/10* (2016.01)

(56) References Cited

U.S. PATENT DOCUMENTS

| | | |
|---|---|---|
| 9,273,850 B2 | 3/2016 | Onac et al. |
| 2001/0013207 A1 | 8/2001 | O'Neill |
| 2010/0053565 A1* | 3/2010 | Mizushima .......... G02B 3/0006 353/38 |
| 2012/0275132 A1 | 11/2012 | Minami et al. |
| 2012/0294037 A1 | 11/2012 | Holman et al. |
| 2014/0133125 A1 | 5/2014 | Di Trapani et al. |
| 2014/0160720 A1 | 6/2014 | Seuntiens et al. |
| 2014/0313774 A1* | 10/2014 | Myers .................. F21V 31/005 362/612 |
| 2014/0321113 A1 | 10/2014 | Onac et al. |
| 2015/0184818 A1 | 7/2015 | Jaster |
| 2015/0316231 A1 | 11/2015 | Di Trapani |
| 2016/0102843 A1 | 4/2016 | Onac et al. |

FOREIGN PATENT DOCUMENTS

| | | |
|---|---|---|
| EP | 2304480 A1 | 5/2015 |
| EP | 2918901 A1 | 9/2015 |
| KR | 20100131883 A | 12/2010 |
| WO | 2009156348 A1 | 12/2009 |
| WO | 2011071945 A1 | 6/2011 |
| WO | 2013011410 A1 | 1/2013 |
| WO | 2014/075721 A1 | 5/2014 |
| WO | 2014071012 A1 | 5/2014 |
| WO | 2014076218 A1 | 5/2014 |
| WO | 2015055430 A1 | 4/2015 |
| WO | 2015173770 A2 | 11/2015 |

OTHER PUBLICATIONS

International Search Report/Written Opinion dated Dec. 19, 2016 in counterpart Intl. Application No. PCT/US2016/050613.
European Search Report dated Apr. 9, 2019, in corresponding European Patent Application No. 16847079.7.
Official Action dated Feb. 26, 2019, in corresponding Chinese Patent Application No. CN201680051355.0.

* cited by examiner

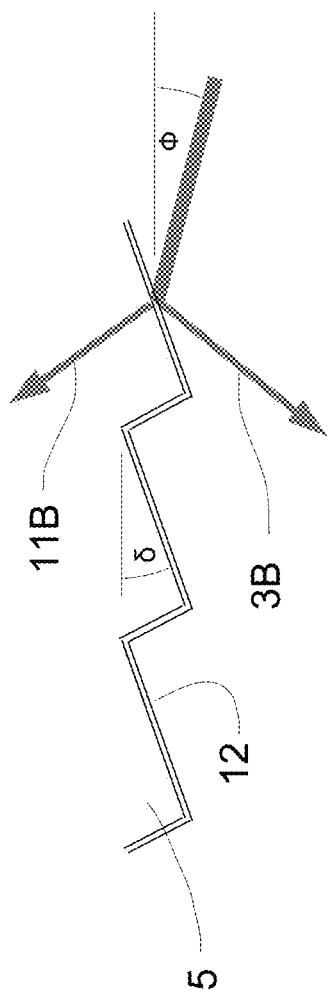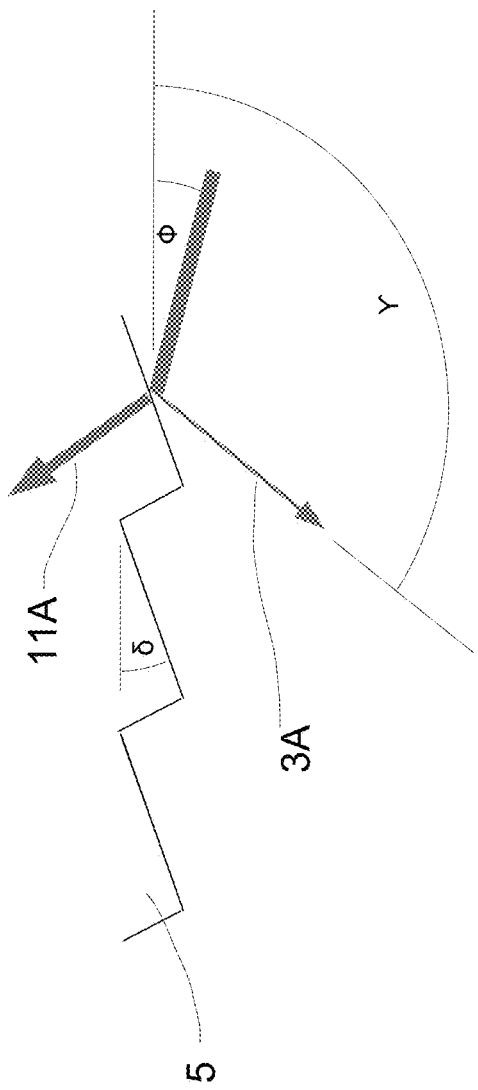

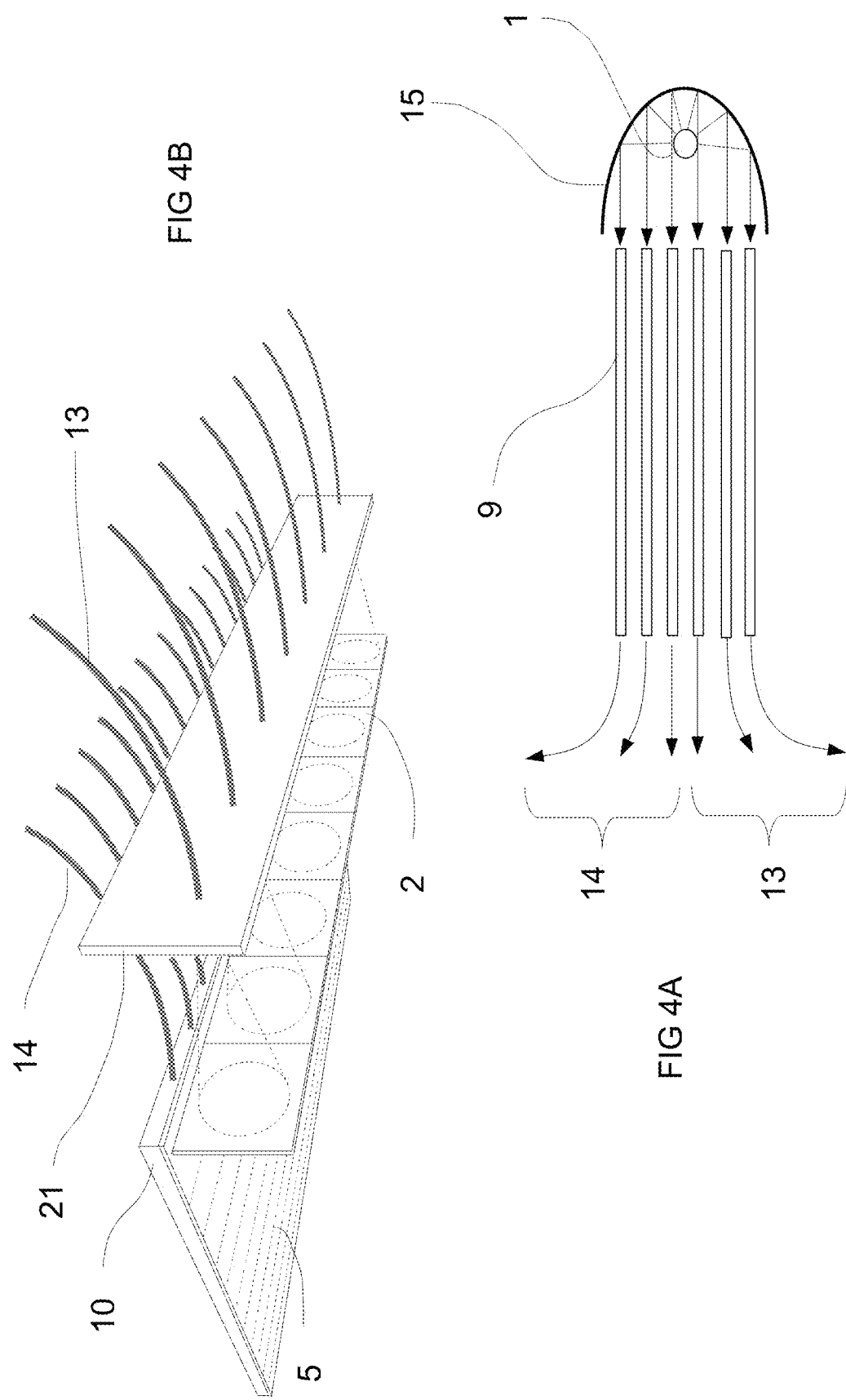

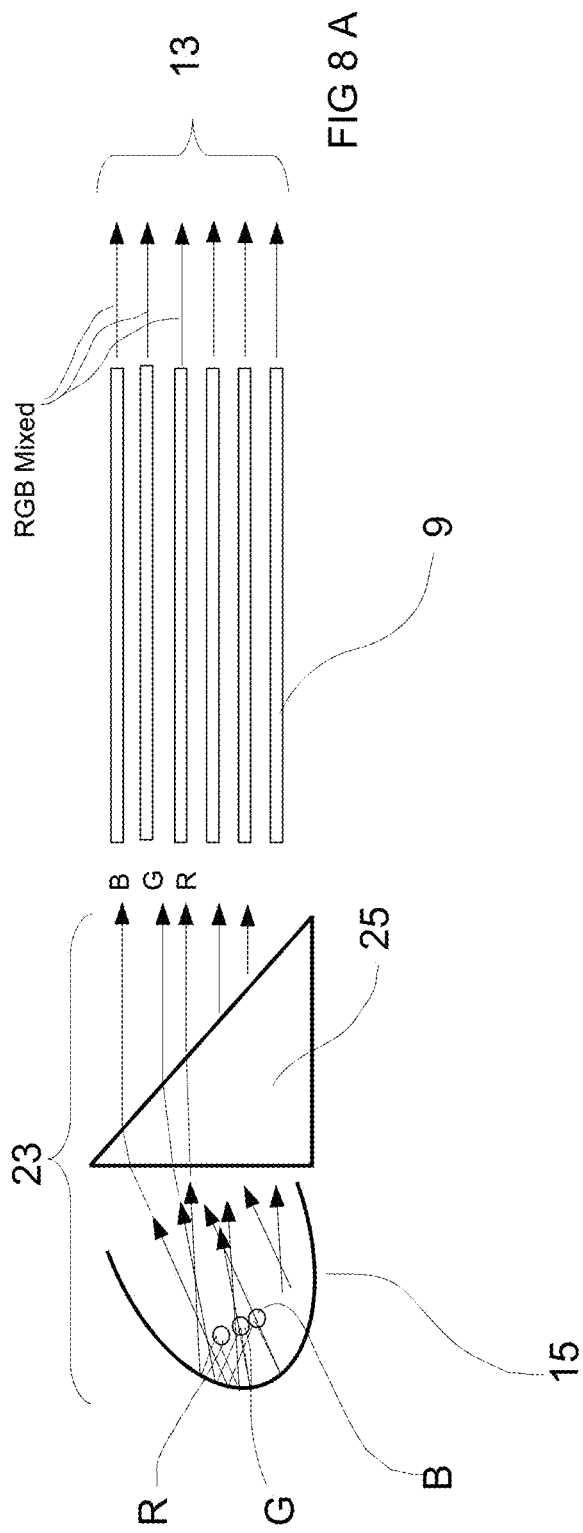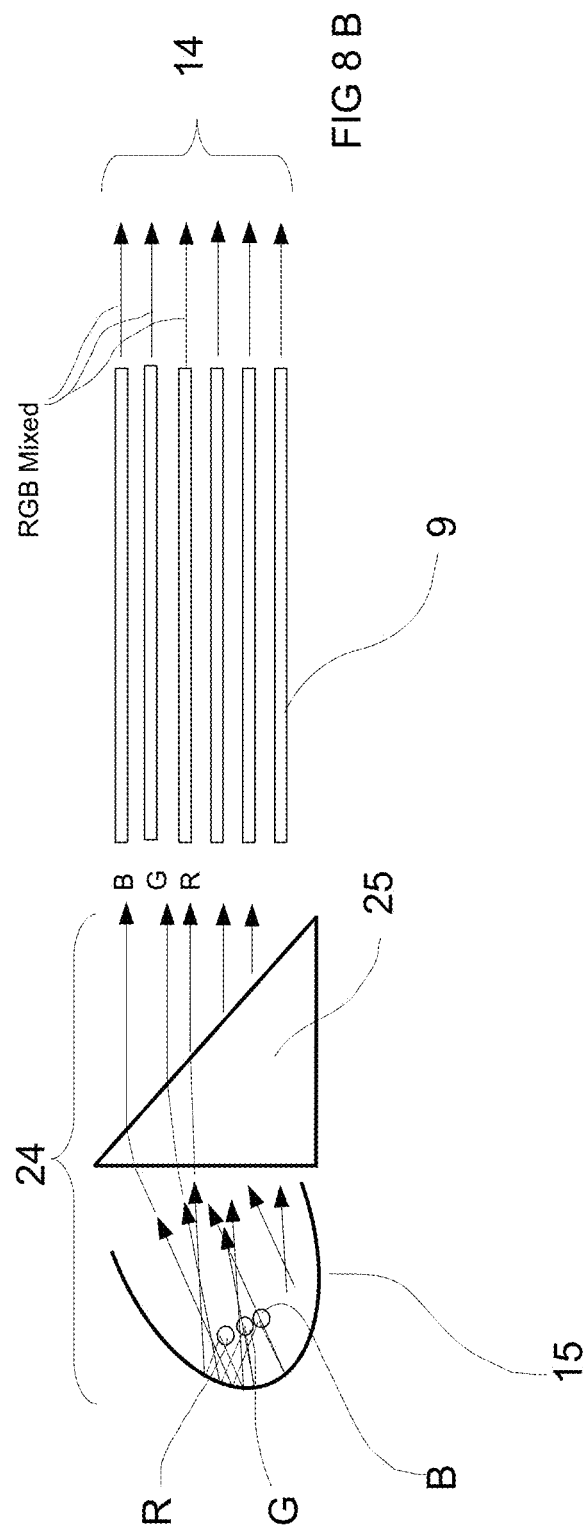

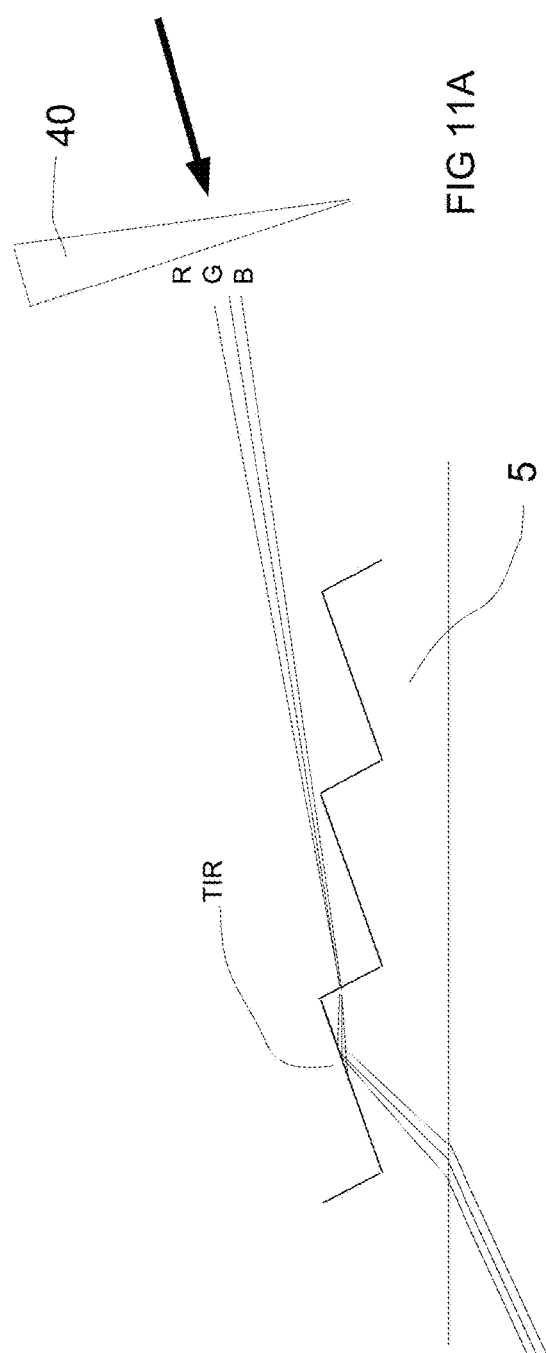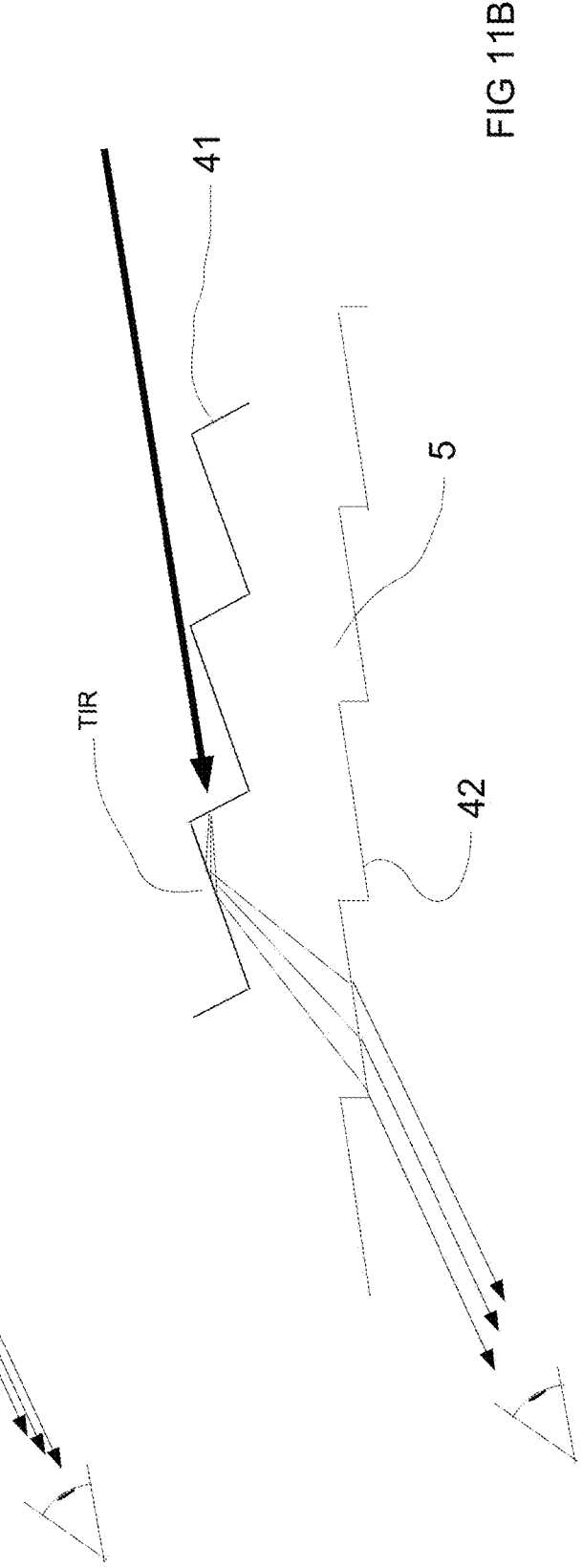

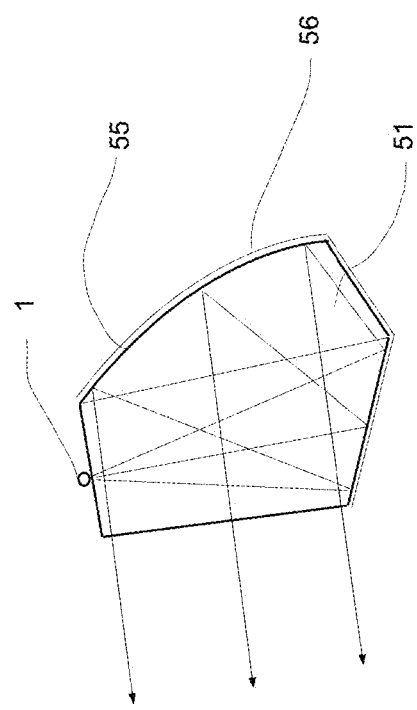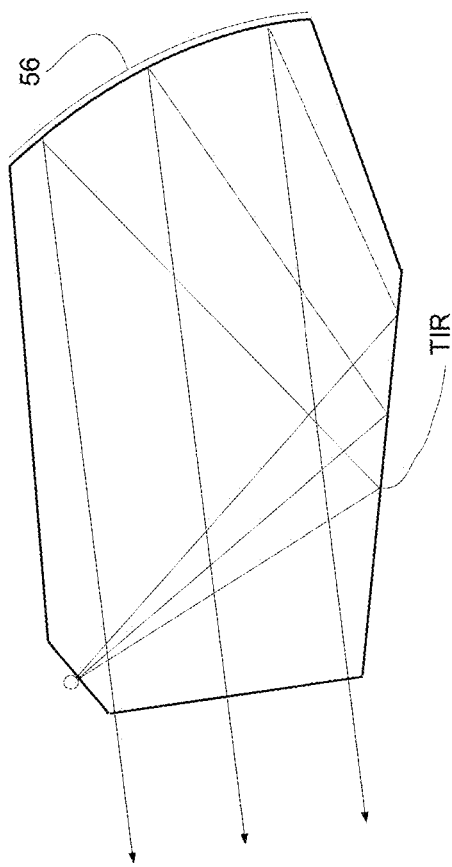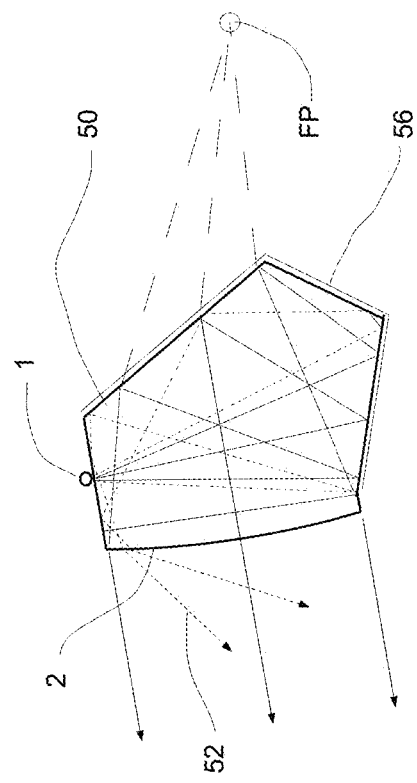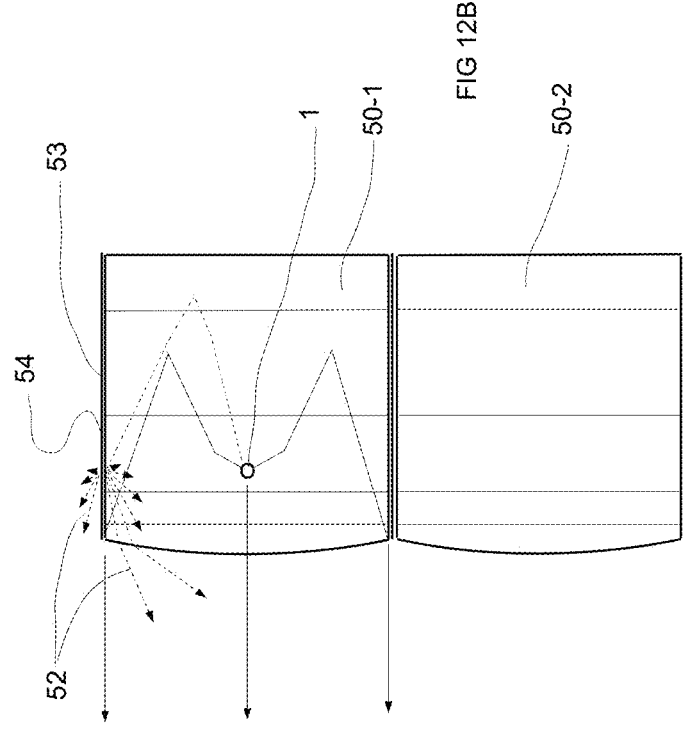

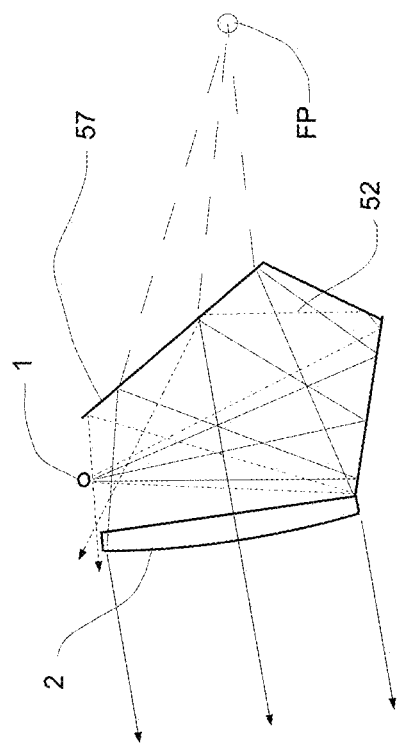
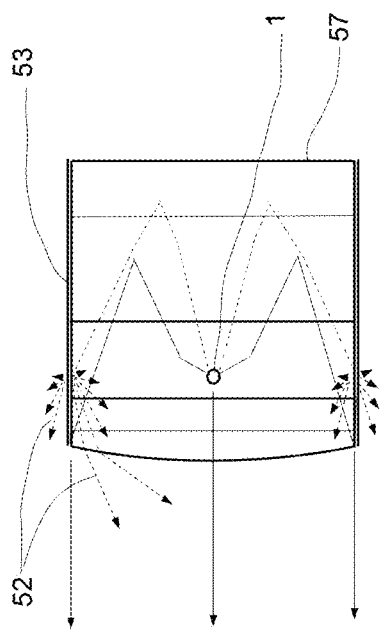
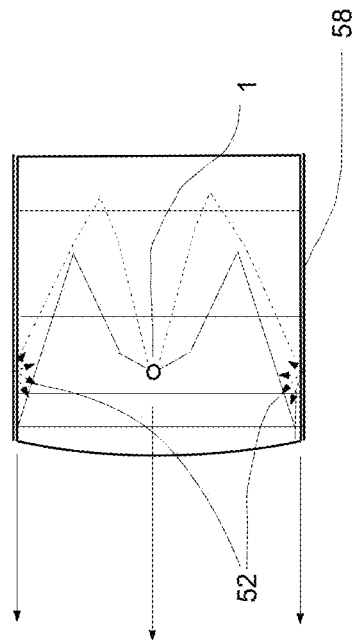
FIG 15
FIG 15A
FIG 16

ARTIFICIAL SKYLIGHT AND METHODS

CROSS REFERENCE TO RELATED APPLICATIONS

This application claims priority to U.S. Provisional Patent Application No. 62/219,419, filed Sep. 16, 2015, and to U.S. Provisional Patent Application No. 62/253,944, filed Nov. 11, 2015, the entireties of which are incorporated by reference herein.

FIELD OF DISCLOSURE

The disclosed systems and methods provide synthetic skylights that present an artificially generated sky of realistic appearance along with a virtual sun, set at infinity.

BACKGROUND

Skylights are often the preferred choice of lighting for a room or office, if one has access to the roof. However, even when access is available the cost of modifying the roof may be high, particularly if existing structures and utilities have to be circumvented. Skylights present other numerous challenges; the amount of light is variable and not easily controllable, unwanted glare can result at different times of the day, and finally UV radiation found in sunlight is known to be harmful to people and property.

Hence, a compact, artificial skylight that could be installed within the confines of a typical ceiling (usually less than 8 inches high between ceiling panel and floor), with a wide field of view (FOV) of the sky would offer a business or domestic user a practical means of enjoying the known psychological benefits of natural lighting, with the added advantage of controlled luminance.

SUMMARY

In some embodiments, an artificial skylight includes at least one light source, at least one first collimator, a prism sheet, and at least one transmissive material. The at least one first collimator is configured to collimate light from the at least one light source. The prism sheet is disposed adjacent to the at least one first collimator and is configured to reflect and refract collimated light received from the at least one first collimator. The at least one transmissive material is disposed adjacent to the prism sheet and is configured to radiate light diffusely.

In some embodiments, a method includes collimating light emitted from at least one light source to provide first collimated light, refracting the first collimated light to provide refracted light, diffusing the refracted light to provide diffuse light, and reflecting the diffuse light.

BRIEF DESCRIPTION OF THE DRAWINGS

Particular embodiments of the of the disclosed systems and methods are now described by way of example, with reference to the accompanying drawings, through which like parts are referred to by like reference numerals and in which:

FIG. 3A is a detail view illustrating one example of how the facet angle of a prism within a prism sheet controls the reflection angle in accordance with some embodiments.

FIG. 3B is a detail view illustrating one example of how specular reflection can be increased by applying a dielectric coating to the prism sheet material in accordance with some embodiments.

FIG. 4A is a diagrammatic plan view of one example of a system in which collimated light is directed into multiple light guides, which subsequently convey light to a collimating lens array and a light panel in accordance with some embodiments.

FIG. 4B is a perspective view of one example of light guides interfacing with a light panel and a line light chassis in accordance with some embodiments.

FIG. 8A is a diagrammatic view of one example of how light from three differently colored light sources can be collimated by way of a parabolic reflector and combined such that they are merged into a common optical path by way of a prism before being injected into multiple guides, which subsequently convey light to the collimating lens array, in accordance with some embodiments.

FIG. 8B is a diagrammatic view of another example of how light from three differently colored light sources can be collimated by way of a parabolic reflector and combined such that they are merged into a common optical path by way of a prism before being injected into multiple guides, which subsequently convey light to a light panel, in accordance with some embodiments.

FIG. 11A is a cross-sectional view of one example of a prism sheet disposed adjacent to, and at a distance from, a reflective surface in accordance with some embodiments.

FIG. 11B is a cross-sectional view of another example of a prism sheet disposed adjacent to, and at a distance from, a reflective surface in accordance with some embodiments.

FIG. 12A illustrates one example of a prism folding light emanating from a light source in accordance with some embodiments.

FIG. 12B illustrates one example of how stray rays of light within the prism illustrated in FIG. 12A escape the prism as diffuse light in accordance with some embodiments.

FIG. 13 illustrates another example of a prism having a parabolic surface for collimating light in accordance with some embodiments.

FIG. 14 illustrates one example of a reflective surface coupled to a parabolic collimator for folding the light path in accordance with some embodiments.

FIG. 15 illustrates one example of light reflecting off of a specular reflector enclosure in accordance with some embodiments.

FIG. 15A illustrates one example of the diffusion of stray light within a reflective enclosure in accordance with some embodiments.

FIG. 16 illustrates one example of an occlusion panel for preventing stray light from encroaching on a neighboring enclosure in accordance with some embodiments.

DETAILED DESCRIPTION

Figure 1:
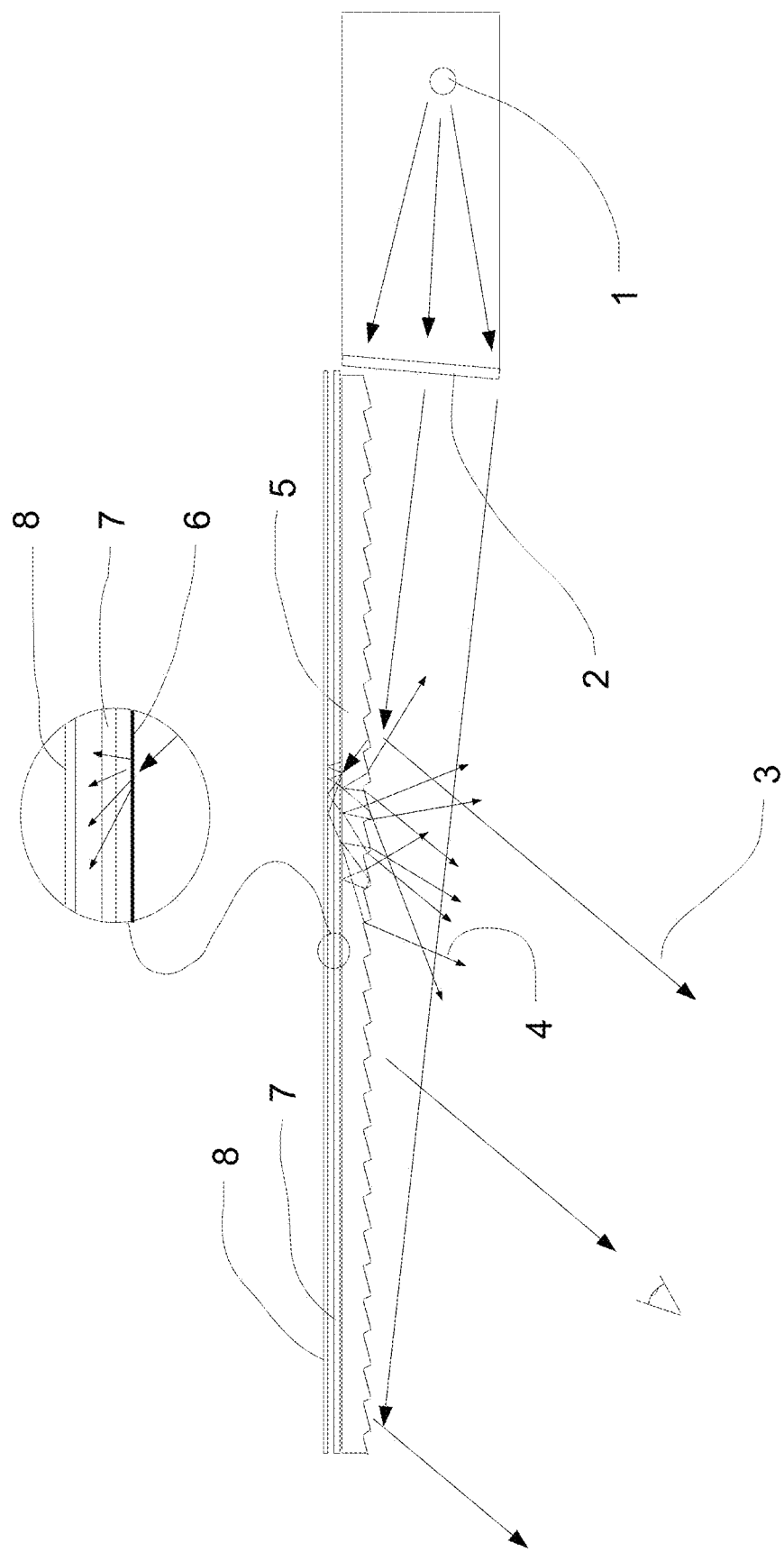
FIG. 1 is a cross-sectional view of one example of an artificial skylight in accordance with some embodiments and demonstrates how the light cone from a light source is collimated and subsequently directed onto a prism sheet whereupon it is subsequently reflected while being partially transmitted. The reflected and transmitted light is spectrally shifted by a color filter and then redirected back through the same prism sheet to an observer, below.

This description is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. In the claims, means-plus-function clauses, if used or implied, are intended to cover the structures described, suggested, or rendered obvious by the written description or drawings for performing the recited function, including not only structural equivalents but also equivalent structures.

The disclosed embodiments of systems and methods enable the creation of a virtual solar source and a diffuse blue sky such that the problem of providing diffuse illumination approximating the sky, along with highly collimated light approximating the sun, can be avoided. Further, the disclosed systems are compact enough to be installed within a typical ceiling cavity such that they can be installed in office spaces or other rooms without natural ambient light. The disclosed systems and methods also decouple the collimated solar light from the diffuse sky light in such a way that the blue sky may be observed over a wide field of view.

In some embodiments, the disclosed systems and methods provide an observer with a synthetic sky, which can include a default setting of blue or other color, having a realistic appearance. In some embodiments, the artificial skylight is configured to provide a realistic looking sun optically set at infinity, e.g., a distance so vast that light rays from any point on the object enter the eye as a substantially planar wave front. Such an artificial skylight offers architects and lighting engineers the option of creating new and otherwise unobtainable lighting effects, such as well-defined shafts of light and shadows, to complement a habitable space. Furthermore, many offices and rooms can seem claustrophobic when there is no apparent view to the outside world, but embodiments of the disclosed artificial skylight can help alleviate this problem and make the area relatively inviting. Finally, the psychological effects of receiving sufficient sunlight, particularly during the winter months and in higher latitudes, are well documented and it is generally recognized that the absence of such can cause seasonally affected disorder (SAD) in susceptible individuals. Conventional methods of providing simulated sunshine by use of broad spectrum artificial lighting is not always practical given the high lux levels required, whereas exposure to a discrete and tightly focused beam of artificial sunlight as provided by the disclosed systems and methods enables people to receive the necessary lux without having to stand close to the source, or alternatively, having to raise the lux level of the entire room.

In some embodiments, an artificial skylight includes a one dimensional array of light sources, e.g., light emitting diodes (LEDs), and a one dimensional array of collimating lenses, e.g., Fresnel lenses, such that each lens collimates the light from one of the light sources. A plurality of angled reflective surfaces, such as a multi-faceted transparent prism sheet, is provided upon which the substantially collimated rays from the collimating lenses are incident. A set of occlusion panels are configured to permit one light source to encompass any given collimating lens by shielding it from adjoining light sources, and a surface that radiates diffuse light also is provided. In some embodiments, the diffuse light is blue light approximating a sky, which is transmitted through the faceted prism. In some embodiments, the occlusion panels are formed from a composite material, such as bakelite, however a person of ordinary skill in the art will understand that other opaque materials can be used.

In some embodiments, the array of lights are white LEDs; however, in some embodiments, the array of lights are the termination points of optical light guides, which can each be approximately 8 mm in diameter. A person of ordinary skill in the art will understand that the light guides may be provided in diameters greater or less than 8 mm. The collimating lenses are part of a contiguous array and collimate the light from their specific LEDs so that a broad parallel beam of light, such as one would associate with sunlight, is incident upon a sheet of material carrying a plurality of prism facets, herein referred to as a "prism sheet." The prism sheet, which is formed from a substantially transparent material, such as acrylic, redirects the parallel beam of light toward the observer by way of reflection, to create a virtual sun. Furthermore, the prism sheet influences the angle of the reflected light in accordance with the angle of its constituent prism facets, hence the angle of a virtual beam of sunlight can be controlled by selecting the appropriate prism facet angle. In one embodiment, the degree of the reflected light is enhanced by application of a dielectric coating such as titanium oxide ("$TiO_2$") at approximately 50 nm thickness, although other materials and thicknesses can be used.

In some embodiments, the plurality of lights of the array includes "occlusion panels" made of material approximately 0.5 mm thick placed between each collimating lens to ensure each collimating lens receives light from a respective one of the plurality of lights. By this process, a single virtual sun is perceived by the viewer.

The virtual sky is created by radiating diffuse light through the substantially transparent prism sheet. The aforementioned one dimensional array of lights, hereinafter referred to as a "line light," also is a source of the diffuse lighting in the disclosed systems, although it may be augmented by use of an independent light panel situated above or below the prism sheet. The light panel can be used to emit dynamically changing diffuse colored light to simulate changing sky conditions.

In some embodiments, converting white collimated light incident upon the prism sheet into diffuse blue light includes transmitting collimated light that is not reflected by the prism sheet, e.g., refracted light, through a prismatic surface of the prism sheet and diffusing the light as the refracted light, which is transmitted through a planar surface by way of a diffusion layer that is created by application of a frosting coat. A person of ordinary skill in the art will appreciate that the diffusion layer may be a property integral to the prism sheet created, for example, by surface roughening. The diffused light then transmits through a color filter that biases it toward the blue end of the spectrum, typically around 7000 K. The diffuse light then strikes a reflective layer behind the filter which redirects the diffuse light back through the aforementioned color filter and prism sheet to present itself as a diffuse, blue background.

It may be appreciated that other options and arrangements for diffusing the redirected light also exist and that filters, other than blue, may be used.

Referring now to FIG. 1, a linear array of point sources 1 is shown being substantially collimated by a plurality of lenses 2, such as Fresnel lenses (e.g., one lens 2 per light source 1). Each lens 2 collimates and directs light 3 from a respective point light source 1 onto a partially reflective prism sheet 5. Light that is not specularly reflected, transmits through a transparent medium (such as a medium including acrylic material) comprising the prism sheet and is diffused upon exiting the planar side 6 of prism sheet 5. The light passing through the planar side 6 of prism sheet 5 then transmits through a color filter 7, which is disposed adjacent to prism sheet 5 and biases the light toward the blue end of the spectrum. A reflective panel 8 is disposed adjacent to color filter 7 and redirects the light 4 received from color filter 7 back through color filter 7 and diffuser (hence the light is now highly diffuse) to eventually exit through the prism sheet 5, thus presenting itself as a diffuse blue sky.

Figure 6:
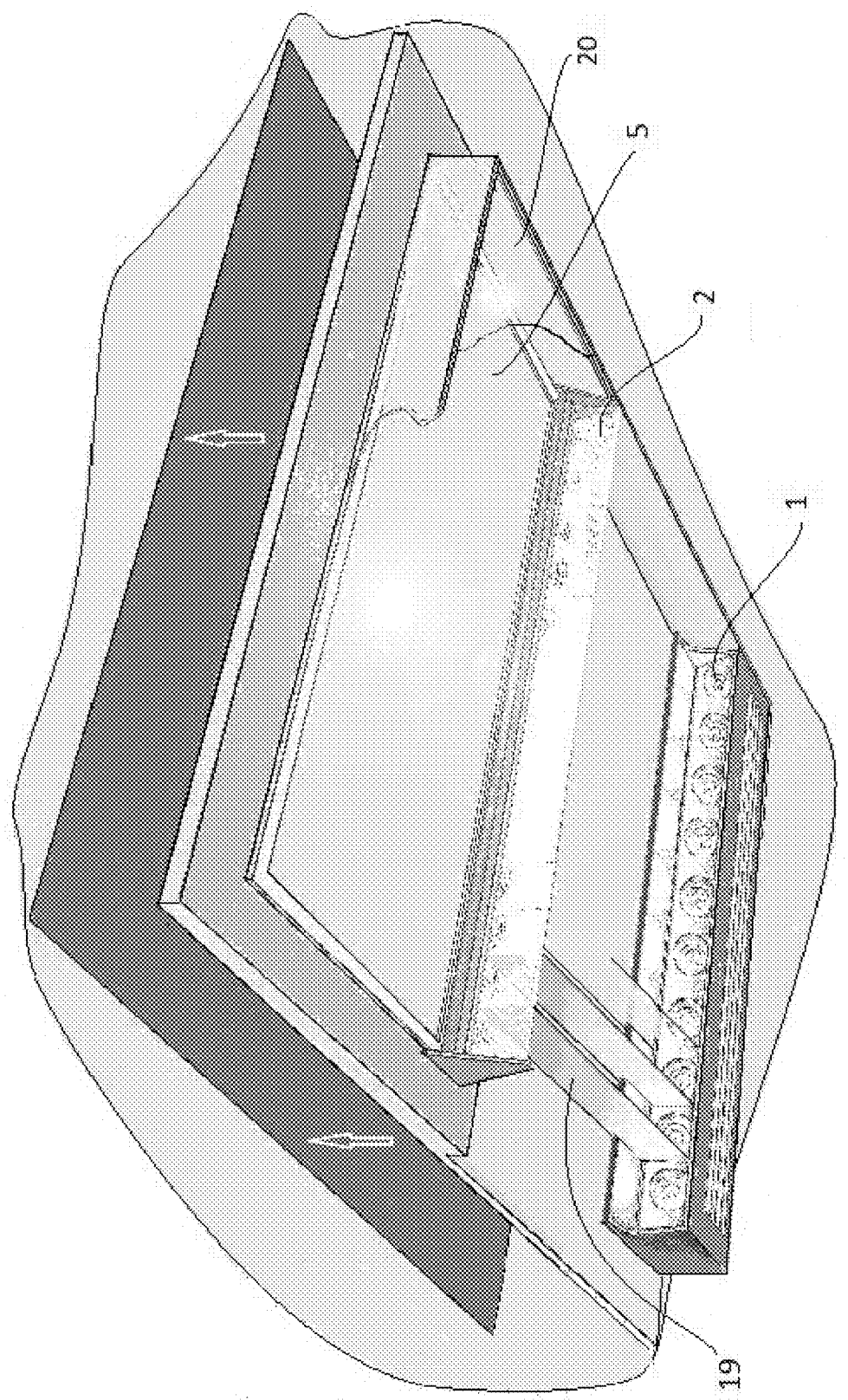
FIG. 6 is a perspective view of an artificial skylight being installed in a ceiling in accordance with some embodiments.

In some embodiments, the color filter and diffuser may be combined such that a colored diffuser is placed behind said prism sheet or alternatively, a diffuse, colored film is applied directly to the planar side of the prism sheet by way of spraying a frost effect coating. Yet another combination of diffuser and filter includes a planar side of a prism sheet that is textured or "roughened" such that it diffuses light and the material comprising the prism sheet is pigmented blue or any color so desired of the sky, throughout, by introduction of a dye during the molding process or by employing one of known pigmentation techniques to color a base material. Not shown in FIG. 1 is a transparent substrate, such as glass, which can be placed in a spaced relationship from prism sheet 5, such as by the width of the Fresnel lens 2, such that skylight includes a sealed interior between reflective surface 8 and prism sheet 5. One example of such a transparent substrate 20 is shown in FIG. 6.

Figure 2:
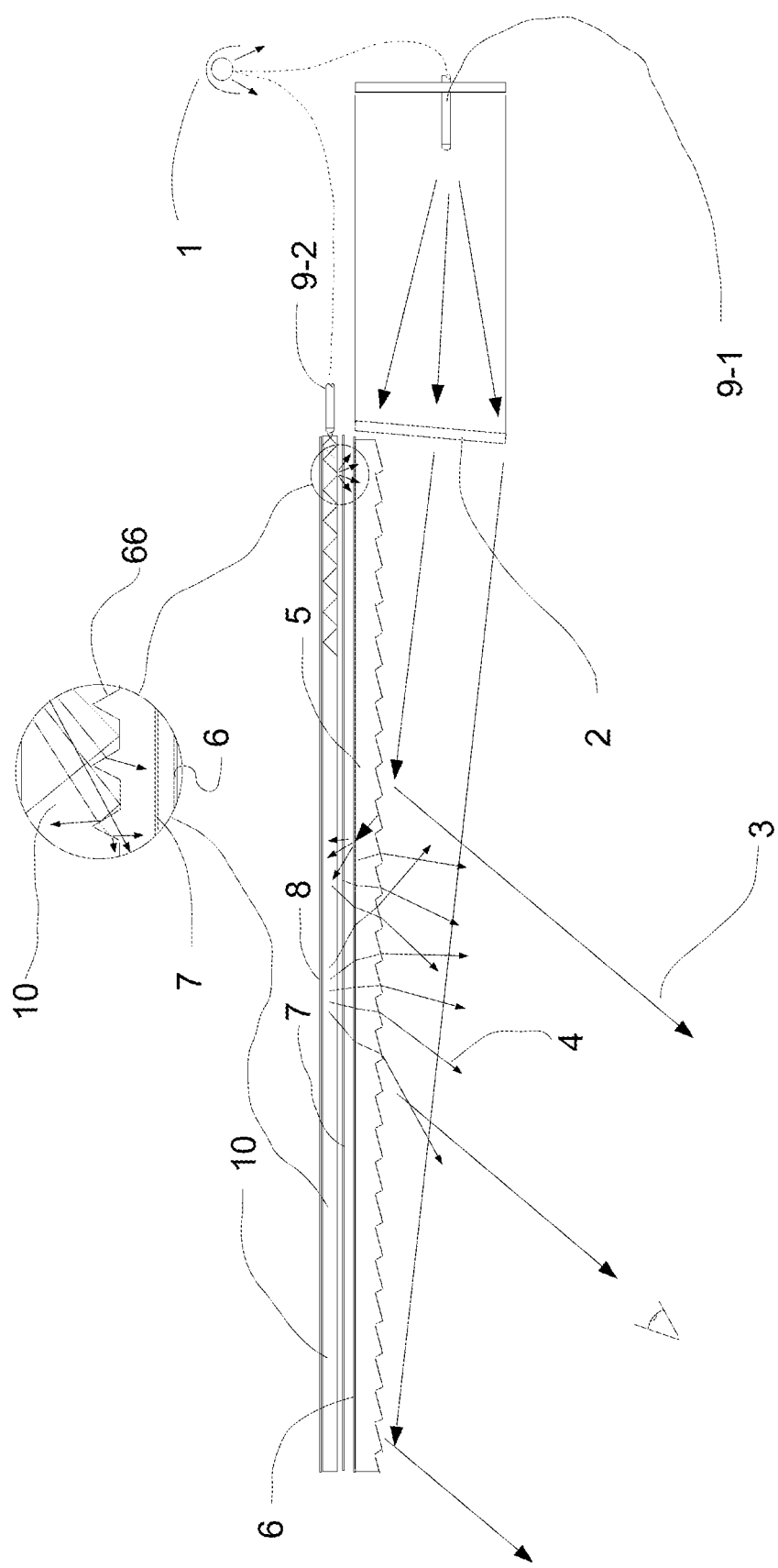
FIG. 2 is a cross-sectional view of another example of an artificial skylight in accordance with some embodiments including an alternative means of relaying light to the system by way of multiple optic guides and an alternative means of providing diffuse light by way of a light panel.
Figure 7:
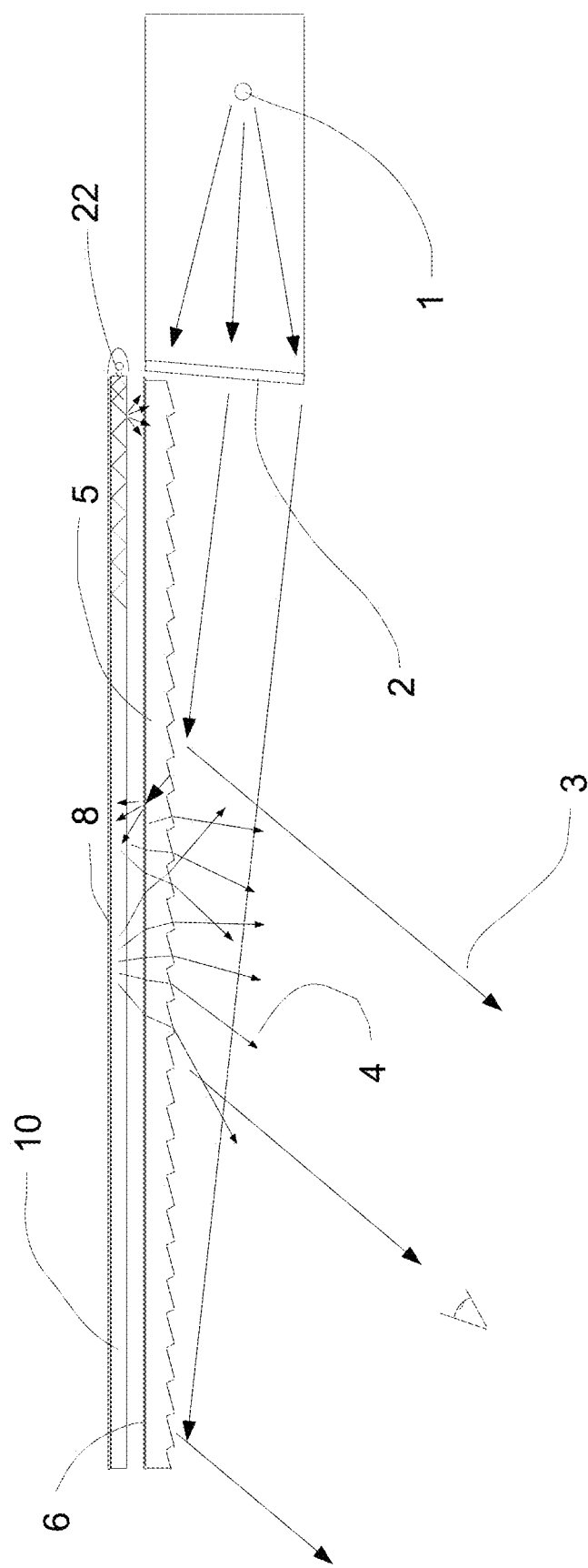
FIG. 7 is a cross-sectional view of another example of an artificial skylight including an LED array for relaying light to a light panel in accordance with some embodiments.

Turning now to FIG. 2, which illustrates another arrangement of an artificial skylight, a point light source 1 is shown as the termination point of a light pipe 9-1 and the diffuse light of the sky is augmented by an edge lit light panel 10, which, in some embodiments, also is illuminated by a light pipe 9-2 and is positioned directly behind (or otherwise directly adjacent to) the prism sheet 5. The edge lit light panel 10 can be a wave guide capable of uncoupling light from within and radiating the light diffusely in all directions. In some embodiments, light panel 10 carries blue (or other colored) light generated by an array of LEDs 22 (as shown in FIG. 7) such that the color filter 7 can be omitted, but remains an option. Note that the light from the lenses 2 that transmits through the prism sheet is not wasted but serves to boost the lux level of the light carried by the light panel.

Another advantage of using a plurality of light pipes 9 to convey light to both the prism sheet 5 and light panel 10 is that the unit can be sealed to reduce maintenance costs. FIGS. 4A and 4B illustrate one example of how the use of light pipes 9 to convey light from point light source(s) 1 and provides a reduced maintenance assembly. A remote, partially collimated light source 1 can be placed in a location that is easily accessible, such as in a wall at a level adjacent to a light switch, and is configured to convey light to a plurality of light pipes 9 as shown in FIG. 4A. The light pipes 9 can be split into groups 13, 14 such that the light pipes 9 in group 14 provide light to the light panel 10 shown in FIG. 4B, while the light pipes 9 in group 13 travel to and are supported by the line light support panel 21 that directs the light to be collimated by the Fresnel lenses 2 also shown in FIG. 4B. It may be appreciated that more than one light source 1 shown in FIG. 4A and collimator 15 may be employed for this task.

Once installed, the light pipe 9 advantageously does not need to be removed. Once the emissive source, i.e., point light source 1, fails, it alone needs to be replaced. Thus, the light sources 1 can be placed in a wall at a convenient level and provide the light for the skylight, which can be positioned in a ceiling or other location that may otherwise be difficult to access.

If however, illumination by a local light source(s) is preferred, such as in the arrangement shown in FIG. 1, the skylight assembly may be designed to be fixed directly to a ceiling, such as shown in FIG. 6, or mounted by way of simple clamp fixtures within a hung ceiling. If direct electrical illumination is preferred, it will be appreciated that the unit can also be hinged like a loft door to allow easy access to the light, whilst the weight of the unit is carried by said referenced hinges.

As noted above with respect to FIG. 1, the disclosed skylights can be fitted with an exterior transparent substrate 20 (shown in FIG. 6), such as a sheet of glass, to protect the prism sheet 5 and other components within from being scratched, and from the ingress of dust. Further, occlusion panels 19 may be positioned between adjacent light sources. As noted above, occlusion panels 19 can be fabricated from a composite material, such as bakelite, although other materials can be used for occlusion panels.

Figure 5:
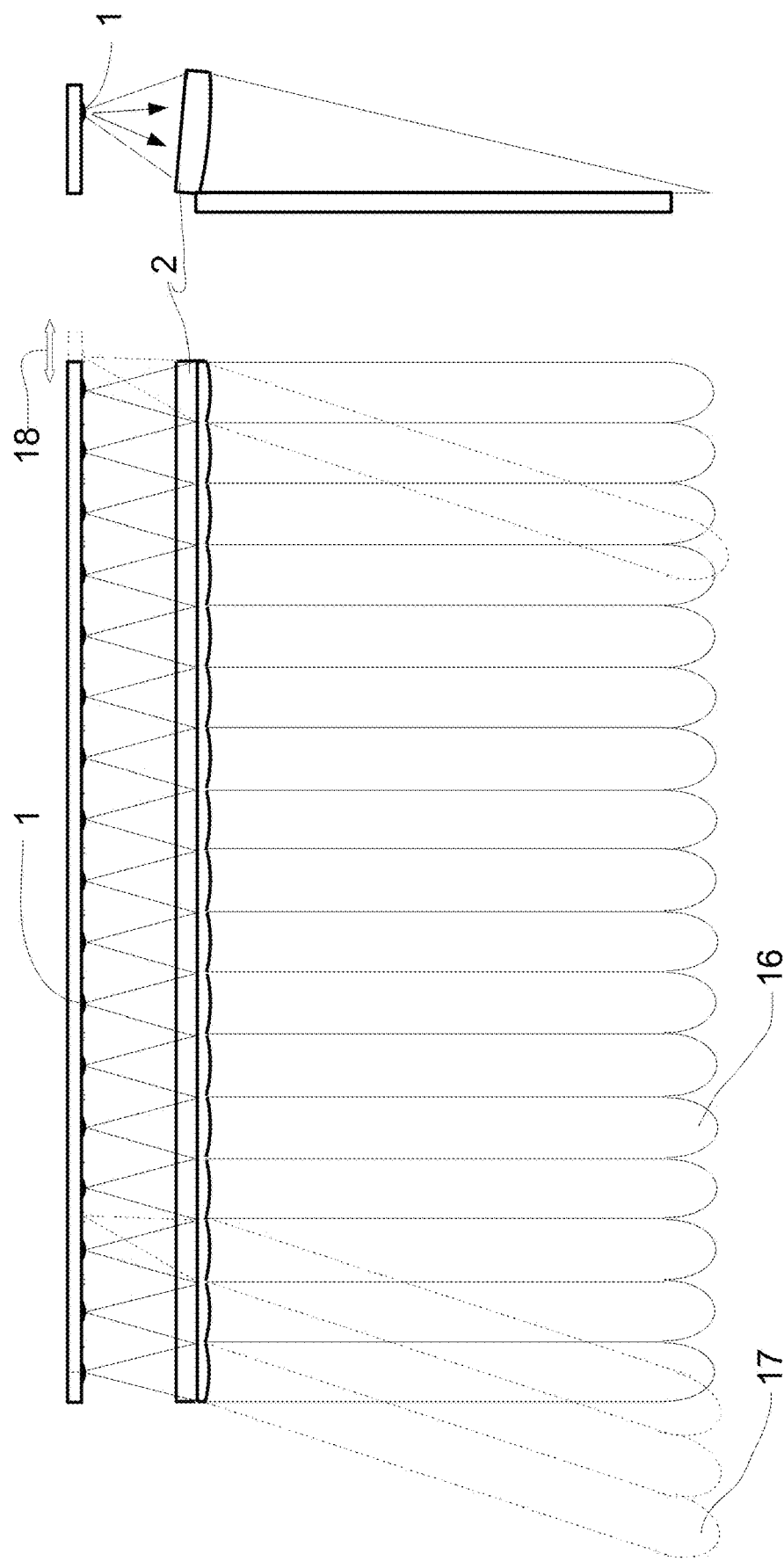
FIG. 5 is a diagrammatic example of the direction of the collimated beam can be moved by moving the line light left and right of the central axes of the collimating lenses in accordance with some embodiments.

Returning now to the virtual sun image; the angle of the apparent sun image 16 may be changed 17 in a number of ways. For example, the line light may be slid left and right as illustrated in FIG. 5 such that the transverse movement of the sun, as identified by reference numeral 18, is dynamic and may be altered remotely. Having control over directionality of the light is highly desirable. For example, one may choose to illuminate an area very selectively and very starkly as if by a shaft of sunlight and this could be for reasons of improving overall lighting by brightening a corner, or for aesthetic reasons, where an architect, for example, may want to create startling effects, an ambience or lighting mood, befitting of the space. The virtual sun can dynamically change brightness and color to simulate cloud shadows and current time of day through use of a controller having a microprocessor which controls the brightness and color output of light sources 1 throughout the day.

In some embodiments, such as the embodiment(s) depicted in FIGS. 3A and 3B, one or more prism sheets may be swapped out for another prism sheet carrying facets of a different angle. In such embodiments, the longitudinal angle of the sun is predetermined by the user via selection of the prism angle, as identified by 6 in FIGS. 3A and 3B, and can be adjusted by swapping out the prism sheet 5 post installation. Returning to FIG. 3A, here it can be seen how light is reflected off a singular prism facet of a prism sheet 5 by dint of reflection, and its angle of incidence (AOI) altered favorably toward an observer by:

$$180 - 2\delta - \phi = Y$$

Note that, in the case of an uncoated prism sheet, the reflected light 3A is typically much less than the transmitted portion 11A for values of δ greater than 10 degrees, for example, assuming mixed polarity light. Therefore a particularly bright source is required since the reflected light is designed to simulate the sun, which must be bright—almost dazzling, even though the material is substantially transparent. Hence in one embodiment, as shown in FIG. 3B, the addition of a dielectric coating 12 such as $TiO_2$ greatly enhances the intensity of the reflected ray 3B, while reducing the intensity of the transmitted ray 11B. Being almost lossless, the combined intensities of 3B and 11B, approach unity.

Figure 10A:
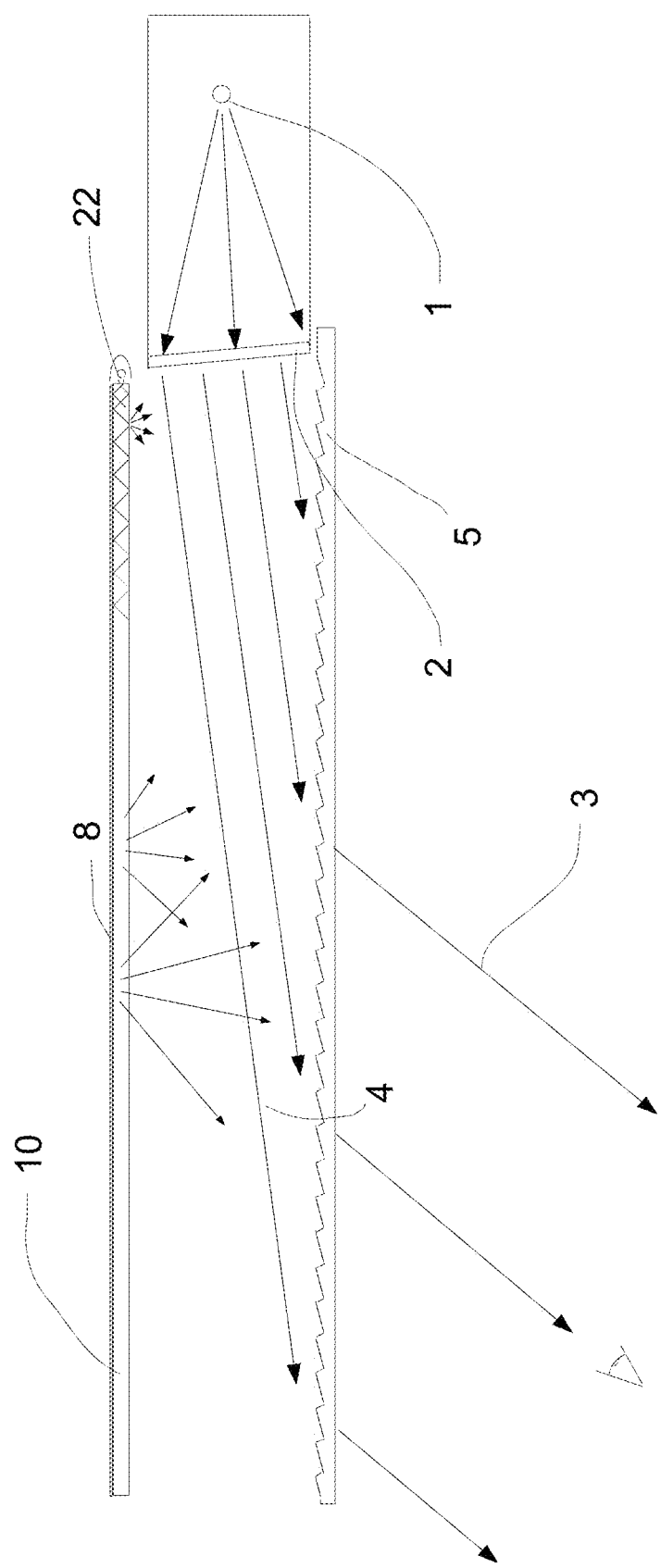
FIG. 10A is a cross sectional view of one example of an artificial skylight that includes an uncoated prism sheet disposed adjacent to, and at a distance from, a diffusion panel in accordance with some embodiments.

In some cases, an uncoated prism sheet 5, i.e., a prism sheet without a reflective coating, is configured to redirect most of the collimated light 3 toward a viewer by being placed adjacent to, but at a distance from, light panel 10 as illustrated in FIG. 10A. In some embodiments, the distance between uncoated prism sheet 5 and light panel 10 is such that collimating optics are able to inject light between an uppermost surface of prism sheet 5 and a lowermost surface of light panel 10.

Figure 10B:
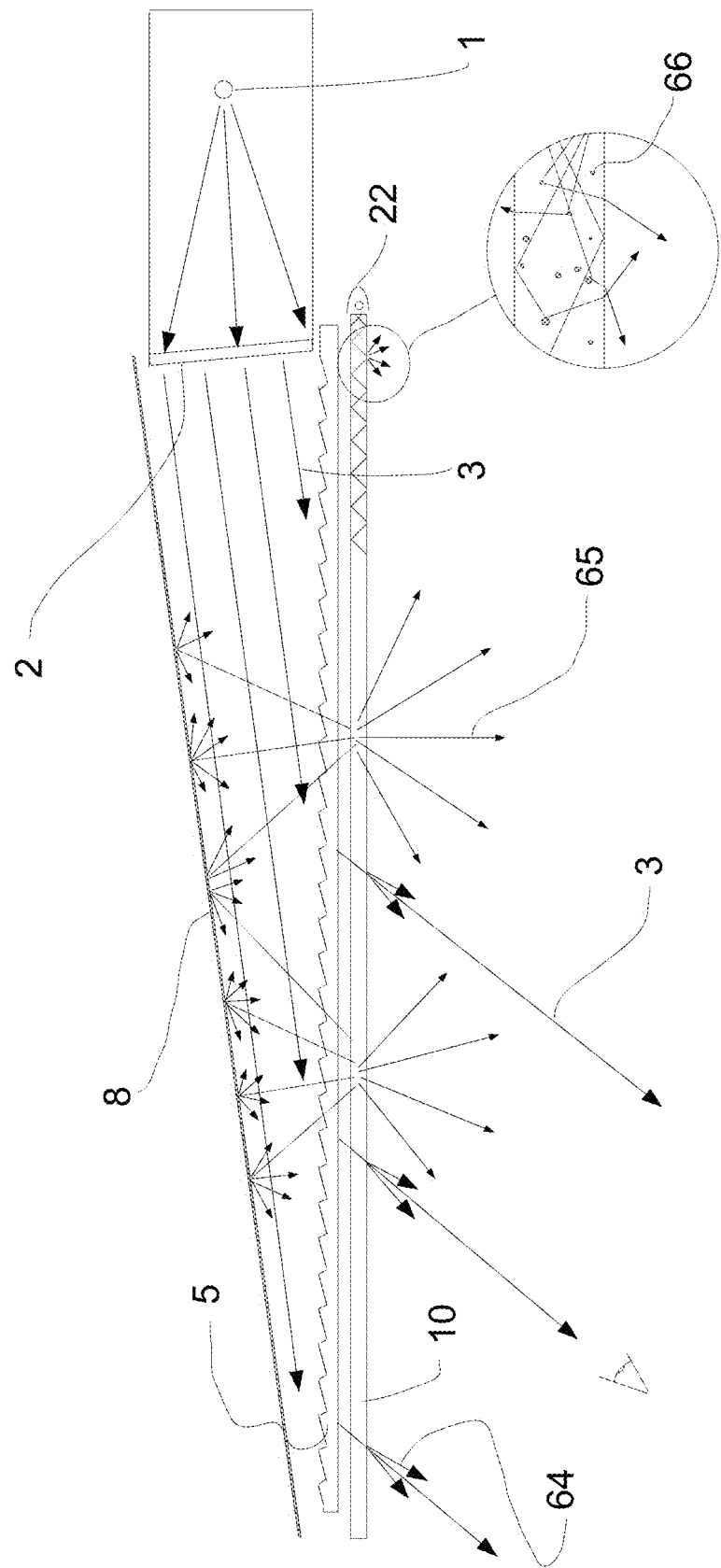
FIG. 10B is a cross sectional view of another example of an artificial skylight that includes an uncoated prism sheet disposed adjacent to, and at a distance from, a diffusion panel in accordance with some embodiments.

FIG. 10B illustrates another example of uncoated prism sheet 5 disposed adjacent to, but at a distance from, light panel 10. As shown in FIG. 10B, light uncoupling features 66, such as laser dots, grooves, or small dispersive particles, within or on a surface of the panel's matrix, will cause a majority of the TIR rays to radiate 65 out of the panel 10. These same features also will cause some of the virtual sun's rays 3 to scatter 64, thereby softening the disc of the virtual sun. In the embodiment shown in FIG. 10B, the collimating optics, such as lens 2, is positioned above an uppermost surface of diffusion panel and between at least a part of an uppermost surface of prism sheet 5 and below a lower surface of reflective surface 8.

Spectral dispersion caused by the refractive properties of prism sheet 5 can be compensated for by introducing compensating optics as shown in FIGS. 11A and 11B. FIG. 11A illustrates how a prism 40 can be configured to disperse light prior to the light entering prism sheet 5 such that when rays transit prism sheet 5 the refraction the light rays undergo reinstates the desired collimation of the RGB rays. Another non-limiting example of an embodiment is shown in FIG. 11B. As shown in FIG. 11B, prism sheet 5 is provided with a dual prismatic surface such that second prismatic surface 42 compensates for spectral dispersion created by first prismatic surface 41.

Figure 9:
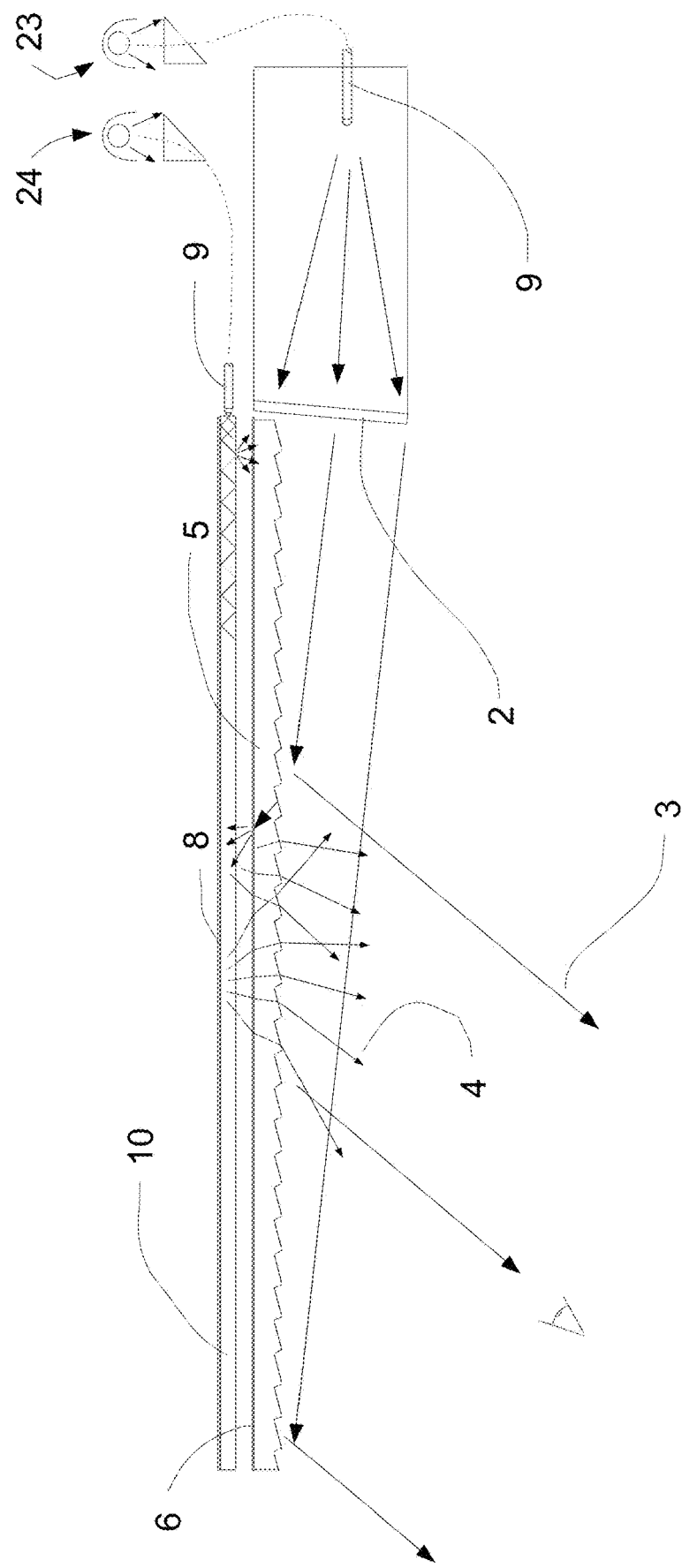
FIG. 9 is a cross sectional view of one example of how light from the two separate light sources shown in FIGS. 8A and 8B is conveyed to a system, such that one source provides illumination specifically to the collimating lens array while the other provides illumination specifically to the light panel.

As previously referenced, it may be desirable to have control over the color of the sky and the sun. In some embodiments, the color of the sky and the sun may be independently and dynamically controlled by providing separate means of illumination, i.e., light sources 22 in FIG. 7 and light sources 23, 24 in FIG. 9. This is further illustrated in FIG. 8A and FIG. 8B, in which both illustrate light from three color-biased sources, one having a predominantly red wavelength (R), one having a predominantly green wavelength (G) and one having a predominantly blue wavelength (B), undergoing collimation. Since all three color biased sources are slightly separated from each other, and since their respective collimated light enters the light pipe in substantially the same direction, a prism 25 is employed to refract their respective rays such that the light from said color biased sources now combine and adopt a substantially common optical path. For this reason, the blue-biased source is positioned such that its rays undergo greatest refraction, while the red-biased source is positioned such that its rays undergo the least. By varying the brightness of each of the color-biased sources 23 conveying light to the virtual sun, a change in the color of said virtual sun can be observed. A change in the virtual sky color can be observed when it's separate means of illumination 24 is likewise altered. However, it will be understood by one of ordinary skill in the art that other means and mechanisms for dynamically altering the color of light from any given source, be it LED based or otherwise, for providing the virtual sun and sky, exist.

The light path from a light source and the collimating optic can be shortened while maintaining the requisite focal length by folding the light path. In some embodiments, the use of occlusion panels can be omitted. For example, FIG. 12A illustrates one example of a solid prism 50 configured to fold light emanating from a respective light source 1, such as an LED light source. In some embodiments with multiple light sources 1, a respective number of prisms 50 may be implemented. The use of prism 50 provides for a more compact collimating system by moving the focal point ("FP") closer to collimating optic 2, which can substantially decrease the overall size of the skylight. A reflective coating 56 is applied to one or more surfaces of prism 50 to direct the light from light source towards collimating optic 2.

Prior to entering prism 50, rays from light source 1 are collimated partially (i.e., constrained to form a narrow beam of calculated divergence). As shown in FIG. 12B, which is a view looking down prism 50 shown in FIG. 12A (identified as prism 50-1 in FIG. 12B), stray rays 52 that diverge beyond the beam are prevented from encroaching on adjacent prism 50-2 as a collimated beam due to rays 52 reflecting and diffusing off of side wall 54 of prism 50 (50-1). The reflection arises from frustrated total internal reflection ("FTIR"), and because FTIR allows some light to be transmitted, the portion that is transmitted is diffused as it transits diffusion layer 53.

FIG. 13 illustrates another example of a prism that can be used in a collimating system. As shown in FIG. 13, prism 51 includes a parabolic surface 55, as opposed to the refractive lens of prism 50, for collimating light. A reflective coating 56 can be applied to at least parabolic surface 55 as shown in FIG. 13. FIG. 14 illustrates how reflective coating 56 can be confined to the parabolic collimator if TIR is employed in folding the light path. One of ordinary skill in the art will understand that other prism folding systems can be implemented.

Further, the light path between the collimating system and the light source can be reduced using structures other than prisms. For example, FIG. 15 illustrates one example of a reflective enclosure 57 that is coupled to collimating optics 2 and disposed adjacent to light source 1. In some embodiments, reflective enclosure 57 is a specular reflector. FIG. 15A illustrates how stray light 52 within reflective enclosure 57 can be diffused, which prevents multiple sun images being apparent to a viewer, by placing a partially transmissive diffusion panel 53 such that some of the light is diffusely reflective while the remainder of the light is diffusely transmitted. In some embodiments, the diffusion panel 53 can be opaque to diffusely reflect all stray light as opposed to just some light. In either case, such a diffusion panel 53 can be fabricated from a thin fabric under tension.

FIG. 16 illustrates how stray light 52 within a reflective enclosure 57 can be prevented from encroaching on a neighboring enclosure using an occlusion panel 58. In this case, the stray light 52 is extinguished or any diffusely reflecting stray light is attenuated by use of a light-absorbing mat surface. Occlusion panel 58 can be made from a thin fabric under tension or other materials as will be understood by a person of ordinary skill in the art.

Figure 17:
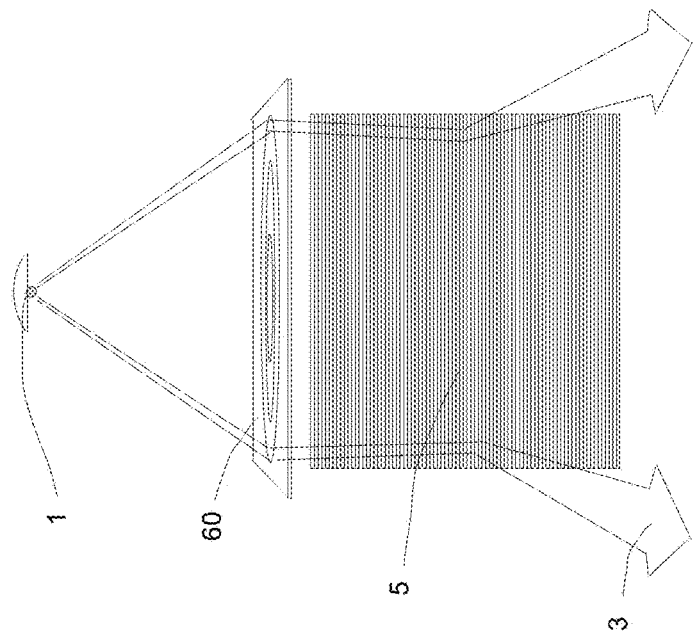
FIG. 17 illustrates one example of an embodiment with a single light source in accordance with some embodiments.

FIG. 17 illustrates one example of an embodiment of a sky light having a single light source 1. As shown in FIG. 17, light source 1 is positioned above a collimating lens 60 disposed adjacent to a prism sheet 5, which is configured to diffuse light 3.

Figure 18A:
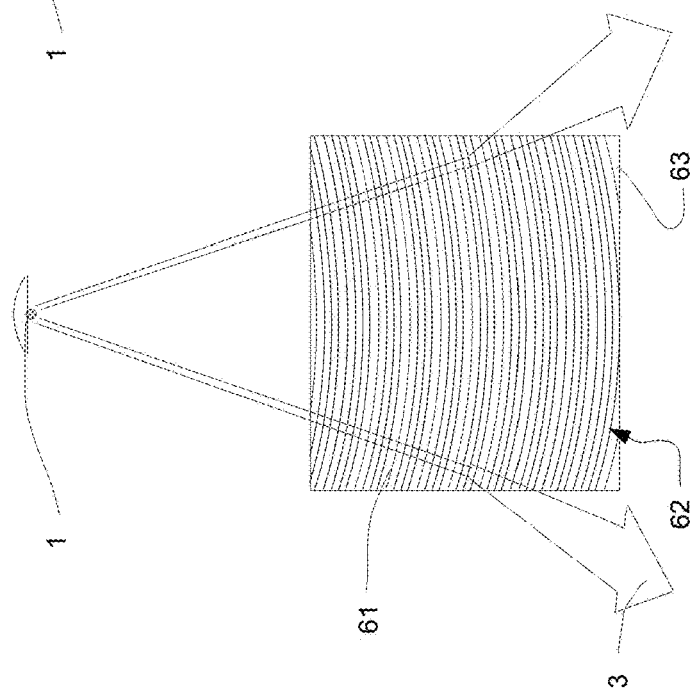
FIGS. 18A and 18B illustrate one example of a sky light without a collimating Fresnel lens in accordance with some embodiments.
Figure 18B:
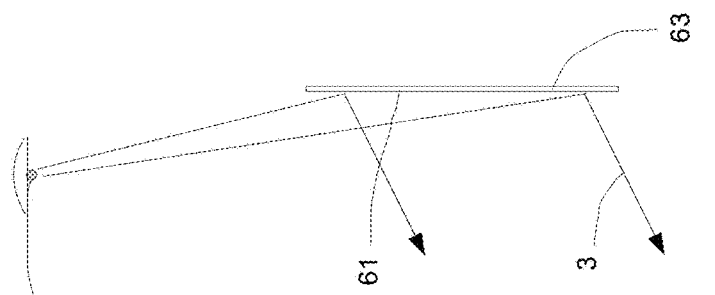

FIGS. 18A and 18B illustrate an embodiment in which the Fresnel lens and prismatic sheet are combined into collimating device 61 by making the prismatic sheet a reflective, flat form parabolic surface. For example, it is apparent looking at FIG. 18A, which is a front side plan view of collimating device 61, that a parabolic design 62 is included in front surface 63. In FIG. 18B, it is apparent that front surface 63 is substantially planar.

In some embodiments, an artificial skylight is configured to provide collimated light incident upon a partially reflective surface and a diffuse light that transmits through the partially reflective surface such that the directly reflected light suggests a distant source, such as sunlight, whilst the diffuse light approximates to sky light.

In some embodiments, an artificial skylight includes a set of occlusion panels to direct the light from one light source to a respective collimating lens. In some embodiments, the partially reflective surface includes a prismatic structure like that of a Fresnel prism. In some embodiments, the partially reflective surface provides substantially specular reflection.

In some embodiments, an artificial skylight includes a single sheet that carries both a reflective surface and an opposing diffuse surface. In some embodiments, the diffuse surface is planar. In some embodiments, the surface that radiates diffuse light is separate from the prism sheet.

In some embodiments, the collimated light is created by a linear array of emissive lights, such as by LED's. In some embodiments, the lights of the linear array of lights approximate to point sources of radiant light. In some embodiments, the lights of the linear array of lights are the termination points of light pipes from which light exits.

In some embodiments, an artificial skylight includes lenses affixed to the termination points to constrain the light cone emanating from the light pipes such that each cone envelopes a collimating lens at full aperture, with at least a little spillover.

In some embodiments, an artificial skylight includes a light panel to convey additional, diffuse light that is transmitted through the prism sheet.

In some embodiments, an artificial skylight includes a color filter interposed between a diffusing surface and a back reflector to create a synthetic sky. In some embodiments, the diffuse sky color is provided by the light panel alone. In some embodiments, light pipes provide the source of illumination for said light panel.

In some embodiments, an artificial skylight includes a diffusing surface that is separate from the prism sheet.

In some embodiments, an artificial skylight includes a color filter that can also diffuse light.

In some embodiments, an artificial skylight includes a prism sheet that has a diffusive paint applied directly to the planar side of said prism sheet, such that said diffusive paint obviates the need of a separate color filter.

In some embodiments, an artificial skylight includes a prism sheet with a diffusive planar surface that is pigmented the color of the sky, thereby combining the functions of refractive prism, color filter and diffuser.

In some embodiments, the color of the virtual sun and the virtual sky is controlled such that the color of the virtual sun can be altered independently of the color of the virtual sky, and vice versa, by varying the brightness of respective RGB light sources.

In some embodiments, an artificial skylight includes a glass cover placed over the skylight so as to protect it from dust.

In some embodiments, a prism sheet does not include a diffuser and is placed adjacent to, but at a distance from, a diffusive light panel such that the collimated light constituting the virtual sun is redirected toward a viewer by the facets of the prism sheet.

What is claimed is:
1. An artificial skylight, comprising:
   at least one light source;
   at least one first collimator configured to collimate light from the at least one light source to produce a collimated light beam;
   a prism sheet disposed adjacent to the at least one first collimator and configured to reflect and refract the collimated light beam received from the at least one first collimator; and
   at least one transmissive material disposed adjacent to the prism sheet, the at least one transmissive material configured to radiate light diffusely;
   wherein the prism sheet is configured to:
      redirect part of the collimated light beam received from the at least one collimator by way of reflection to create a virtual sun; and
      refract part of the collimated light beam received from the at least one collimator towards the at least one transmissive material;
   wherein the at least one transmissive material is configured to radiate diffuse refracted light to create a virtual sky; and
   wherein, in operation, an output from the artificial skylight comprises a mixture of the collimated light forming the virtual sun and the diffuse refracted light forming the virtual sky.

2. The artificial skylight of claim 1, wherein the prism sheet is disposed directly adjacent to the at least one transmissive material.

3. The artificial skylight of claim 1, wherein the at least one light source is configured to inject rays of light between the prism sheet and the at least transmissive material.

4. The artificial skylight of claim 1, wherein the at least one light source is configured to inject rays of light between the prism sheet and at least one reflective surface of a reflective panel.

5. The artificial skylight of claim 1, wherein the at least one light source includes a plurality of light sources arranged in an array, and wherein the at least one first collimator includes a plurality of first collimators arranged in a linear array of collimators, each of the plurality of first collimators configured to collimate light from a respective one of the plurality of light sources.

6. The artificial skylight of claim 5, further comprising an occlusion panel disposed between adjacent light sources of the plurality of light sources.

7. The artificial skylight of claim 5, wherein the array of light sources are configured to be moved transversely with respect to the array of collimators.

8. The artificial skylight of claim 1, further comprising at least one first light pipe having a first end and a second end; and at least one second collimator disposed adjacent to the at least one light source and to the first end of the at least one first light pipe, the at least one second collimator configured to direct light from the at least one light source into the first end of the at least one first light pipe.

9. The artificial skylight of claim 8, wherein the at least one first collimator is disposed adjacent to the second end of the at least one light pipe.

10. The artificial skylight of claim 9, further comprising at least one second light pipe having a first end and a second end, the first end of the at least one second light pipe disposed adjacent to the at least one light source and configured to receive light from the at least one light source and from the at least one second collimator, the second end of the at least one second light pipe disposed adjacent to a light panel that includes the at least one diffuser surface.

11. A method of generating an output of an artificial skylight, comprising:
   collimating light emitted from at least one light source to provide a first collimated light beam;
   reflecting part of the first collimated light beam by at least one prism sheet to create a virtual sun;
   refracting part of the first collimated light beam to provide refracted light;
   diffusing the refracted light to provide diffuse refracted light; and
   reflecting the diffuse refracted light to create a virtual sky;
   wherein the output of the artificial skylight comprises a mixture of the collimated light forming the virtual sun and the diffuse refracted light forming the virtual sky.

12. The method of claim 11, further comprising, prior to collimating the light emitted from the at least one light source to provide the first collimated light beam:
   receiving light emitted from the at least one light source in a first end of at least one first light pipe; and
   emitting light emitted from the at least one light source from a second end of the at least one first light pipe.

13. The method of claim 12, further comprising:
   receiving light emitted from the light source in a first end of a second light pipe; and
   emitting light from the light source from a second end of the second light pipe that is disposed adjacent to a light guide such that light emitted from the second end of the second light pipe is received in the light guide.

14. The method of claim 12, further comprising collimating light emitted from the at least one light source to provide a second collimated light beam prior to emitting light emitted from the at least one light source from a second end of the at least one first light pipe.

15. The method of claim 11, wherein the at least one light source includes a plurality of light sources arranged in an array, the method further comprising moving the array of light sources transversely relative to an array of collimating devices.

16. An artificial skylight, comprising:
   a plurality of light sources arranged in an array;
   a plurality of first collimators arranged in a linear array of collimators, each of the plurality of first collimators configured to collimate light from a respective one of the plurality of light sources;
   a prism sheet disposed adjacent to the plurality of first collimators and configured to reflect and refract collimated light received from the plurality of first collimators;
   at least one transmissive material disposed adjacent to the prism sheet, the at least one transmissive material configured to radiate light diffusely; and
   an occlusion panel disposed between adjacent light sources of the plurality of light sources.

17. An artificial skylight, comprising:
   a plurality of light sources arranged in an array;
   a plurality of first collimators arranged in a linear array of collimators, each of the plurality of first collimators configured to collimate light from a respective one of the plurality of light sources;
   a prism sheet disposed adjacent to the plurality of first collimators and configured to reflect and refract collimated light received from the plurality of first collimators; and
   at least one transmissive material disposed adjacent to the prism sheet, the at least one transmissive material configured to radiate light diffusely;
   wherein the array of light sources are configured to be moved transversely with respect to the array of collimators.

18. An artificial skylight, comprising:
   at least one light source;
   at least one first collimator configured to collimate light from the at least one light source;
   a prism sheet disposed adjacent to the at least one first collimator and configured to reflect and refract collimated light received from the at least one first collimator;
   at least one transmissive material disposed adjacent to the prism sheet, the at least one transmissive material configured to radiate light diffusely;
   at least one first light pipe having a first end and a second end; and
   at least one second collimator disposed adjacent to the at least one light source and to the first end of the at least one first light pipe, the at least one second collimator configured to direct light from the at least one light source into the first end of the at least one first light pipe.

19. The artificial skylight of claim 18, wherein the at least one first collimator is disposed adjacent to the second end of the at least one light pipe.

20. The artificial skylight of claim 19, further comprising at least one second light pipe having a first end and a second end, the first end of the at least one second light pipe disposed adjacent to the at least one light source and configured to receive light from the at least one light source and from the at least one second collimator, the second end of the at least one second light pipe disposed adjacent to a light panel that includes the at least one diffuser surface.

21. A method, comprising:
   (a) receiving light emitted from at least one light source in a first end of at least one first light pipe; and
   (b) emitting light emitted from the at least one light source from a second end of the at least one first light pipe;
   (c) after steps (a) and (b), collimating light emitted from the at least one light source to provide first collimated light;
   (d) refracting the first collimated light to provide refracted light;
   (e) diffusing the refracted light to provide diffuse light; and
   (f) reflecting the diffuse light.

22. The method of claim 21, further comprising:
   receiving light emitted from the light source in a first end of a second light pipe; and
   emitting light from the light source from a second end of the second light pipe that is disposed adjacent to a light guide such that light emitted from the second end of the second light pipe is received in the light guide.

23. The method of claim 21, further comprising collimating light emitted from the at least one light source to provide second collimated light prior to emitting light emitted from the at least one light source from a second end of the at least one first light pipe.

24. A method, comprising:
   collimating light emitted from at least one light source to provide first collimated light;
   refracting the first collimated light to provide refracted light;
   diffusing the refracted light to provide diffuse light;
   reflecting the diffuse light; and
   wherein the at least one light source includes a plurality of light sources arranged in an array, the method further comprising moving the array of light sources transversely relative to an array of collimating devices.

25. The artificial skylight of claim 1, wherein the at least one transmissive material is configured to radiate light diffusely through the prism sheet.

26. An artificial skylight, comprising:
   a first light source;
   at least one first collimator configured to collimate light from the first light source to produce a collimated light beam;
   a prism sheet disposed adjacent to the at least one first collimator and configured to reflect at least part of the collimated light beam received from the at least one first collimator to produce a collimated beam output; and
   a light panel disposed adjacent to the prism sheet, the light panel configured to radiate light diffusely as a diffuse light output; and
   a second light source configured to illuminate the light panel;
   wherein, in operation, an output from the artificial skylight comprises a mixture of the collimated beam output and the diffuse light output.

* * * * *